United States Patent
Raudsepp et al.

(10) Patent No.: US 10,857,617 B2
(45) Date of Patent: Dec. 8, 2020

(54) CONTACT NOZZLE WITH SPLIT TIP

(71) Applicant: ESAB AB, Gothenburg (SE)

(72) Inventors: Hannes Hugo Raudsepp, Täby (SE); Pierre Magnus Robert Svedlund, Kumla (SE)

(73) Assignee: ESAB AB, Gothenburg (SE)

( * ) Notice: Subject to any disclaimer, the term of this patent is extended or adjusted under 35 U.S.C. 154(b) by 498 days.

(21) Appl. No.: 15/630,705

(22) Filed: Jun. 22, 2017

(65) Prior Publication Data
US 2018/0369947 A1   Dec. 27, 2018

(51) Int. Cl.
| | |
|---|---|
| *B23K 9/26* | (2006.01) |
| *B23K 9/12* | (2006.01) |
| *B23K 9/032* | (2006.01) |
| *B23K 9/18* | (2006.01) |
| *B23K 9/173* | (2006.01) |

(52) U.S. Cl.
CPC ............... *B23K 9/26* (2013.01); *B23K 9/032* (2013.01); *B23K 9/123* (2013.01); *B23K 9/124* (2013.01); *B23K 9/188* (2013.01); *B23K 9/173* (2013.01)

(58) Field of Classification Search
CPC ........ B23K 9/032; B23K 9/123; B23K 9/124; B23K 9/173; B23K 9/26
USPC .......................................................... 219/136
See application file for complete search history.

(56) References Cited

U.S. PATENT DOCUMENTS

| | | | |
|---|---|---|---|
| 6,559,416 B1 * | 5/2003 | Steenis ................. | B23K 9/123 219/137.61 |
| 8,247,737 B2 | 8/2012 | Raudsepp et al. | |
| 2003/0019857 A1 * | 1/2003 | Takagi .................. | B23K 9/173 219/137.61 |
| 2003/0127444 A1 | 7/2003 | Steenis et al. | |
| 2005/0121419 A1 * | 6/2005 | Samler .................. | B23K 9/167 219/75 |
| 2010/0140242 A1 * | 6/2010 | Raudsepp ............. | B23K 9/188 219/136 |
| 2011/0036821 A1 | 2/2011 | Ruehrnoessl et al. | |

(Continued)

FOREIGN PATENT DOCUMENTS

| | | |
|---|---|---|
| EP | 1266714 A1 | 12/2002 |
| WO | 2013095221 A1 | 6/2013 |

OTHER PUBLICATIONS

Notification of Transmittal of International Search Report and Written Opinion, including International Search Report and Written Opinion of PCT/IB2018/054474 dated Oct. 17, 2018.

*Primary Examiner* — Erin E McGrath
(74) *Attorney, Agent, or Firm* — Edell, Shapiro & Finnan, LLC (57) ABSTRACT

A contact device for feeding current to one or more welding wires in a welding apparatus includes a split tip nozzle having first and second diametrically opposed slots formed therein and a biasing means for supplying an adjustable biasing force to first and second split tips to bias the first and second split tips together to ensure that a desired contact between the split tip nozzle and the one or more welding wires is maintained throughout the lifecycle of the nozzle. The biasing force may be applied by any means including, for example, a compression ring, interaction of tapered surfaces between the tube and the split tip nozzle, a compression or cylinder spring pre-mounted on the first and second split tips, a tensioning screw, etc.

19 Claims, 9 Drawing Sheets

(56) References Cited

U.S. PATENT DOCUMENTS

2015/0014282 A1 1/2015 Raudsepp
2015/0336198 A1 11/2015 Raudsepp

* cited by examiner

CONTACT NOZZLE WITH SPLIT TIP

FIELD OF THE DISCLOSURE

The present invention relates to welding and more specifically to a contact nozzle assembly for a welding apparatus.

BACKGROUND

Welding apparatus, methods and processes are well known. One known welding process is referred to as submerged arc welding (SAW). SAW is a welding method characterized by high productivity and quality, often used for longer welding seams in thicker materials. It is well known in a SAW process to use a consumable electrode (e.g., a welding wire) to form a weld puddle between a pair of workpieces to be joined. A voltage between the electrode and the workpieces forms an arc therebetween to create the weld puddle.

SAW is often characterized in that the melted material of the electrode is protected beneath a layer of pulverized flux. A portion of the flux is consumed during the welding process, creating a protecting layer of slag on the weld puddle.

It is desirable to increase the productivity of a SAW process. One way to accomplish this is to increase the weld speed and the deposition rate (e.g., the rate at which weld metal is deposited into the weld puddle). One known way to increase the deposition rate is to use multiple wires in a single weld puddle. Using more than one welding wire in a single weld puddle enables increased deposition rates and therefore improves the economy of the welding process.

The welding wires can be arranged in various settings or formations. For instance, the welding wires can be positioned in transverse relation (i.e., perpendicular to a welding direction), or they may be positioned in longitudinal relation (i.e., parallel to or collinear with the welding direction), or a combination thereof. Where the two hot wires are positioned in transverse relation, they may be positioned side by side. This arrangement may be used for surface welding or specific joints where a wide joint is desired. Side by side welding generally leads to lower penetration and greater width. Where the two welding wires are spaced a longitudinal distance from each other with respect to the welding direction, the first welding wire in the direction of welding is normally referred to as a leading hot wire and the second welding wire is normally referred to as a trailing hot wire.

In connection with twin welding wires, it has proven advantageous to use an arrangement in which both wires are fed forward through a common contact device. With such an arrangement more material is provided to the welding joint and increases the coefficient of fullness in the joint. The coefficient of fullness (or volume expansion) is usually measured with what is referred to as the deposition rate.

Regardless of whether the welding procedure uses a single welding wire or multiple welding wires, to properly perform a welding procedure, it is important that the conduction of welding power from the contact device to the welding wire(s) be controlled and consistent. It has long been recognized that a problem exists in consistently conducting welding current from the contact device to the welding wire(s). Historically, the challenge is to get even contact pressure from the contact device on the welding wire(s) during welding and throughout the life cycle of the contact device, even as the contact device wears. In use, in a twin welding wire welding process, pressure is applied perpendicular to the welding wires which means that one of the wires will always have better contact than the other.

Generally speaking, welding power conduction occurs inside a copper contact tip. The contact tip has a hole or opening therethrough for feeding one or more welding wires. The relatively long length of the contact tip in combination with a relatively small clearance between the opening formed in the contact tip and the welding wire increases the probability of inconsistent power conduction.

Under normal operating conditions, the welding wire(s) will remain in constant contact with the contact device. Nevertheless, in some instances there may be momentary conditions in which no contact occurs and, in these situations, the welding current may arc across the gap between the contact device and the welding wire. As will be appreciated, the arcing is detrimental to the welding process.

Uneven contact pressure can occur for a variety of reasons. For example, some prior art contact devices rely on the inherent cast of the welding wire to produce a constant contact between the contact device and the welding wire. However, non-uniformities may exist in the cast of the welding wire. These non-uniformities combined with movements of the welding apparatus during operation inevitably result in momentary disruption of contact between the contact device and the welding wire.

Moreover, as the welding wire is fed through the opening in the contact device, the welding wire may contact the contact device at more than one location simultaneously. At any particular moment, the contact locations between the welding wire and the contact device may be randomly variable along the length of the contact device. Because of the greater electrical resistance of the welding wire than the contact device, the amount of welding current conduction is generally highest at the contact location closest to the downstream end of the contact device (e.g., at the tip of the contact device). As a result, almost all of the preheating of the welding wire occurs between the downstream contact location and the workpiece. Since the contact location furthest downstream invariably changes location within the contact device during a welding operation, the amount of preheating of the welding wire is also varied. Changes in the amount of welding wire preheating may affect the characteristics of the welding arc and therefore may contribute to poor welding performance.

In addition, the relative size of the contact area between the contact device and the welding wire is relatively small. As a result, the typically large welding currents being supplied during a welding process generally result in very high current densities, which may produce tiny micro-welds between the contact device and the welding wire. These small welded areas usually re-melt quickly; however, a stick-slip type of welding wire feed may result, causing repeated micro-weld creation and breakage, thereby contributing to poor welding performance.

In addition, differences in the diameters of the welding wires may exist due to, for example, manufacturing tolerances or flattening of the welding wires as they travel through a feeding mechanism. In such circumstances, the contact device may not press evenly against the welding wires, which in turn, may negatively affect the current transfer to the welding wires.

Moreover, even when the welding apparatus is properly setup, over time the contact device may wear in a way that one of the wires loses contact more than the other. Such wear may contribute to random and inconsistent interfaces between the contact device and the welding wire. In addition, the welding wire may have shavings and other debris clinging to it; when foreign matter enters the contact device, it may become trapped and prevent the welding wire from feeding properly.

All of this may cause an instability in the welding process and increase the risk of defects. Accordingly, numerous attempts have been made to solve one or more of these aspects of the contact device and the welding wire interface problems. Yet, despite the long felt need for a controlled and reliable interface between a contact device and a welding wire, none of the prior solutions is entirely satisfactory.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an improved contact device for feeding current to one or more welding wires. As will be described herein, the various contact devices disclosed herein may be used in connection with feeding a single welding wire or multiple welding wires. The contact device may include a split tip nozzle including at least one slot formed therein, the slot extending from a first end or tip of the split tip nozzle towards a second end to form first and second split tips. The contact device also includes an adjustable biasing means to controllably supply a radially inward biasing force for biasing the first and second split tips against one another. In one example, the contact device may include first and second transversely opposed and aligned slots.

The contact device may further include a contact tube operatively coupled to the split tip nozzle. The contact tube may include a bore formed in the first end thereof, the bore including a partially threaded portion for threadably receiving a portion of the split tip nozzle.

The adjustable biasing means may be supplied by any mechanism. For example, the first end of the tube may include an externally threaded portion for engaging an internally threaded compression ring including an internally tapered surface for contacting an exterior surface of the first and second split tips, the interaction between the internally tapered surface and the exterior surface applying the biasing force to bias the first and second split tips together. The compression ring may be selectively rotated to move axially relative to the tips to vary the radial biasing force as desired.

Alternatively, the bore may include a tapered surface for contacting with a tapered surface formed on the split tip nozzle, the interaction between the tapered surfaces applying the radially inward biasing force to bias the first and second split tips together. For example, the bore may include an outwardly tapered surface adjacent an inwardly tapered surface to form an apex, the interaction between the tapered surface formed in the bore and the apex applying the biasing force to bias the first and second split tips together. Axial displacement between the tapered surfaces permits controlled adjustment of the applied biasing force.

Alternatively, the split tip nozzle may include a biasing member surrounding the first and second split tips, the biasing member including an internally tapered surface for contacting an exterior surface of the first and second split tips, the interaction between the internally tapered surface and the exterior surface applying the radially inward biasing force to the first and second split tips. The biasing member may be pre-mounted to the first and second split tips. The biasing member may be a compression or cylinder spring.

Alternatively, the tube may include at least one internally threaded bore for threadably engaging at least one tensioning screw, the at least one tensioning screw applying the biasing force to bias the first and second split tips.

BRIEF DESCRIPTION OF THE DRAWINGS

By way of example, specific embodiments of the disclosed device will now be described, with reference to the accompanying drawings, in which.

DETAILED DESCRIPTION

Embodiments of a contact device in accordance with the present disclosure will now be described more fully hereinafter with reference to the accompanying drawings. The following disclosure is intended to provide examples of the disclosed apparatus and these examples should not be interpreted as limiting. The contact device of the present disclosure may take many different forms and should not be construed as being limited to those set forth herein. Rather, these examples are provided so that this disclosure will convey certain exemplary aspects of the contact device to those skilled in the art. In the drawings, like numbers refer to like elements throughout unless otherwise noted. One of ordinary skill in the art will understand that the steps and methods disclosed may easily be reordered and manipulated into many configurations, provided they are not mutually exclusive.

Constant contact between one or more welding wires and the contact device is desirable in order to have a stable welding process. In use, it is preferable to maintain constant contact between the one or more welding wires and the contact device at the tip of the contact device for a variety of reasons, for example, reduced wear. Generally speaking, contact devices can be divided into two categories: nozzles and jaws. Nozzles may be generally characterized by a circular or tubular member having a hole for feeding one or more welding wires therethrough. Jaws may be generally characterized by first and second members or portions of members that surround and contact the one or more welding wires. In use, the contact and current transfer between nozzles and jaws is different. For example, nozzles generally use the curvature or cast of the welding wire to make contact. As such, the welding wire may contact the sidewall of the hole formed in the nozzle as the welding wire is fed therethrough. Thus, the contact location between the welding wire and the sidewall of the nozzle may be at an entry point where the welding wire enters the nozzle, at the tip where the welding wire leaves the nozzle, or at a location in-between the entry point and the tip. If the contact location changes, the stability of the welding process may be effected. In addition, as the nozzle begins to wear, the tip of the nozzle will generally wear out first, thus increasing the probability that the welding wire will contact the nozzle at an intermediate location, which may result in a longer electrical stick out, varying wire feed speed and loss of stability in the welding process.

As such, as will be described in greater detail below, the contact device of the present disclosure generally includes a split tip nozzle. In addition, the contact device may include a member or force-providing means for biasing the split tip nozzle together to thereby maintain constant contact and current transfer between the split tip nozzle and the one or more welding wires. By incorporating a split tip nozzle into the contact device, the contact device is configured to flex to provide more consistent contact with the one or more welding wires at the tip of the split tip nozzle. As a result, a consistent contact location can be maintained, which leads to a more stable welding process. Moreover, during the lifecycle of the contact device, as the split tip nozzle begins to wear, the contact device is better able to self-adjust or be manually adjusted to maintain constant contact with the one or more welding wires.

Some contact devices are described and illustrated herein in connection with feeding a single welding wire, while other contact devices are described and illustrated in connection with feeding multiple welding wires. One of ordinary skill in the art will appreciate that the contact devices are interchangeable, and each can be easily modified to work with a single welding wire or multiple welding wires.

Referring to FIGS. 1A-1F, a plurality of views of a contact device 100 for use with a welding apparatus in accordance with the present disclosure is shown. For the sake of convenience and clarity, terms such as "front," "rear," "top," "bottom," "up," "down," "vertical," and "horizontal" may be used herein to describe the relative placement and orientation of various components and portions of the contact device 100.

The contact device 100 may include a split tip nozzle 130. The split tip nozzle 130 may include one or more slots 132 formed therein. The split tip nozzle 130 may include a pair of diametrically opposed slots 132 to form first and second split tips 134, 136. As shown, the slots 132 may extend from a tip of the split tip nozzle 130 to a second end thereof. As will be appreciated by one of ordinary skill in the art, the formation of slots 132 in the split tip nozzle 130 provides the split tip nozzle 130 with flexibility to enhance engagement with one or more welding wires.

The contact device 100 may also include a contact tube 110. The contact tube 110 may include a first end 112, a second end (not shown), and an interior passageway 114 extending from the second end to the first end 112 for feeding one or more welding wires from the second end thereof to the split tip nozzle 130. The first end 112 of the contact tube 110 may include a bore 116 for receiving and engaging the split tip nozzle 130. The split tip nozzle 130 may be coupled to the contact tube 110 by any means now known or hereafter developed, for example, friction fit, snap-fit, adhesive, etc. As shown, the split tip nozzle 130 may include an externally threaded projection 133 for engaging an internally threaded portion 117 of the bore 116 formed in the tube 110.

The first end 112 of the contact tube 110 may also include an externally threaded portion 118 for engaging an internally threaded compression ring 150. In use, as the compression ring 150 is screwed into threaded engagement with the contact tube 110, it applies a radially inward biasing force to the first and second split tips 134, 136 to thereby bias the split tips 134, 136 together to provide a force for supplying consistent pressure against the one or more welding wires being fed therethrough. That is, the compression ring 150 may include an inner tapered surface 152 for contacting and interacting with a tapered surface 154 formed on the split tip nozzle 130. In use, the interaction between the tapered surfaces 152, 154 applies a radially inward biasing force to the first and second split tips 134, 136 to thereby bias the split tips 134, 136 together to provide a force for supplying consistent pressure against one or more welding wires being fed therethrough. For example, the compression ring 150 may include an internal frustoconical surface so that moving the compression ring 150 towards the contact tube 110 forces the split tips 134, 136 together via interaction between the frustoconical surface formed on the inside of the compression ring 150 and the tapered surface formed on the exterior of the split tip nozzle 130. This allows the user to customize the amount of force that is applied by the split tips 134, 136 to the one or more welding wires.

In use, one or more welding wires W are fed through the passageway 114 formed in the contact tube 110 and through the split tip nozzle 130 to the welding puddle. As the one or more welding wires are passed through the split tip nozzle 130, the welding power is transferred from the split tip nozzle 130 to the one or more welding wires so that an arc may be formed or maintained between the wires and the workpieces. During the lifecycle of the contact device 100, the split tip nozzle 130 may experience wear that can adversely affect contact between the wire(s) and the contact nozzle 130. For instances involving slight or minimum amounts of initial wear, the user can make slight adjustments to accommodate for the wear by further tightening the compression ring 150 to force the first and second split tips 134, 136 closer together. Alternatively, the user can fully tighten the compression ring 150 to enable the inherent flex in the first and second split tips 134, 136 to adjust for the wear. In some embodiments, the wear may be so significant that the split tip nozzle 130 must be replaced. To replace the split tip nozzle 130, the user removes the compression ring 150 and the existing split tip nozzle 130 from the contact tube 110. Thereafter, the user threadably couples a new split tip nozzle 130 to the contact tube 110 and then couples the compression ring 150 to the contact tube 110.

As will be appreciated, the inherent flex provided by the slots 132 formed in the split tip nozzle 130 along with the radially inward biasing force supplied by the compression ring 150 ensures that a desired contact between the split tip nozzle 130 and the one or more welding wires can be adjustably maintained throughout the lifecycle of the split tip nozzle 130. As the split tip nozzle 130 becomes worn out, such wear may be easily detected by viewing that both sides of the split tip nozzle 130 (e.g., first and second split tips 134, 136) are in contact with each other or are within a predefined distance from each other. Feeding one or more welding wires through the device may be done in advance of, or after, coupling the split tip nozzle 130 to the contact tube 110.

Figure 1A:
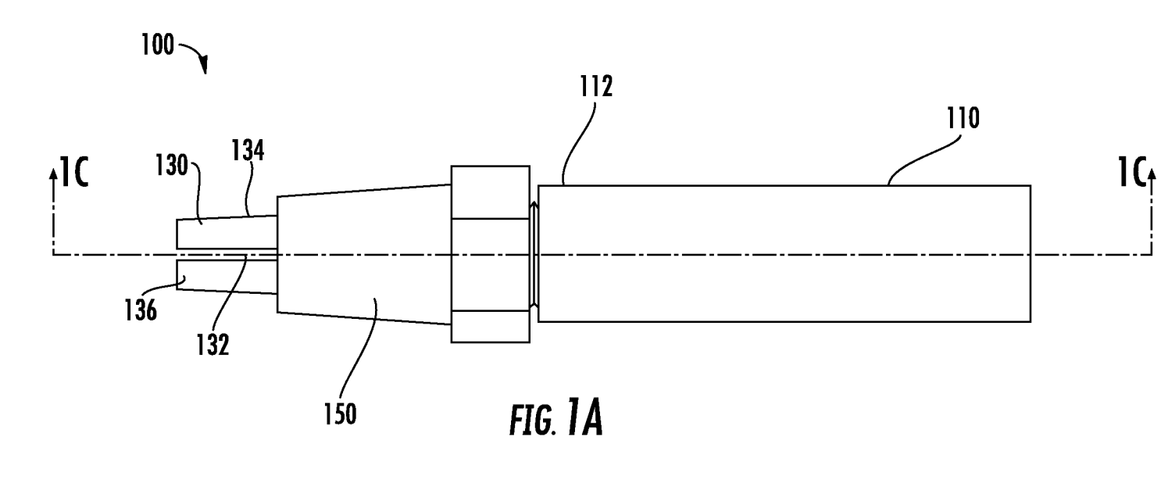
FIG. 1A is a side view illustrating a contact device for use with a welding apparatus in accordance with the present disclosure.
Figure 1B:
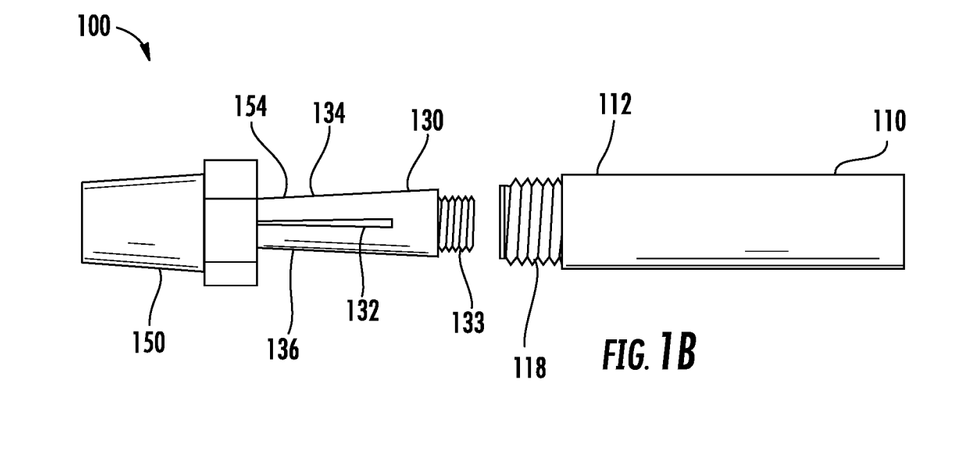
FIG. 1B is an exploded, side view of the contact device shown in FIG. 1A.
Figure 1C:
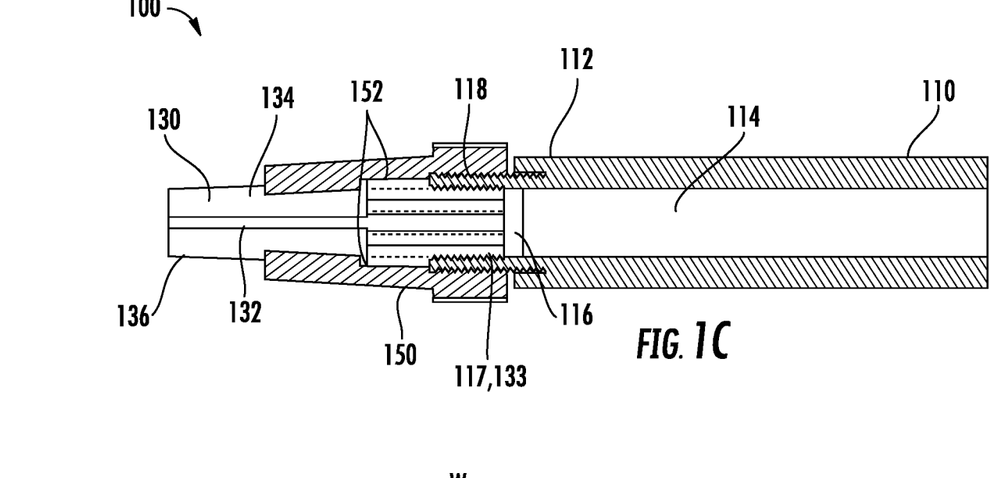
FIG. 1C is a cross-sectional view of the contact device taken along line 1C-1C of FIG. 1A, the contact device being configured to feed a single welding wire therethrough.
Figure 1D:
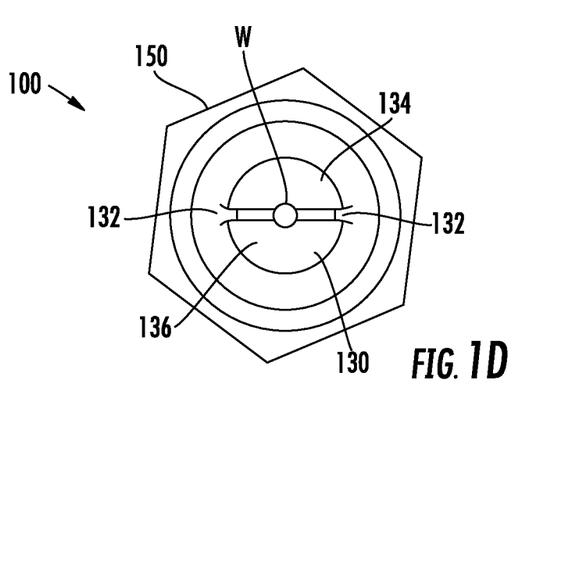
FIG. 1D is a distal end view of the contact device shown in FIG. 1A.
Figure 1E:
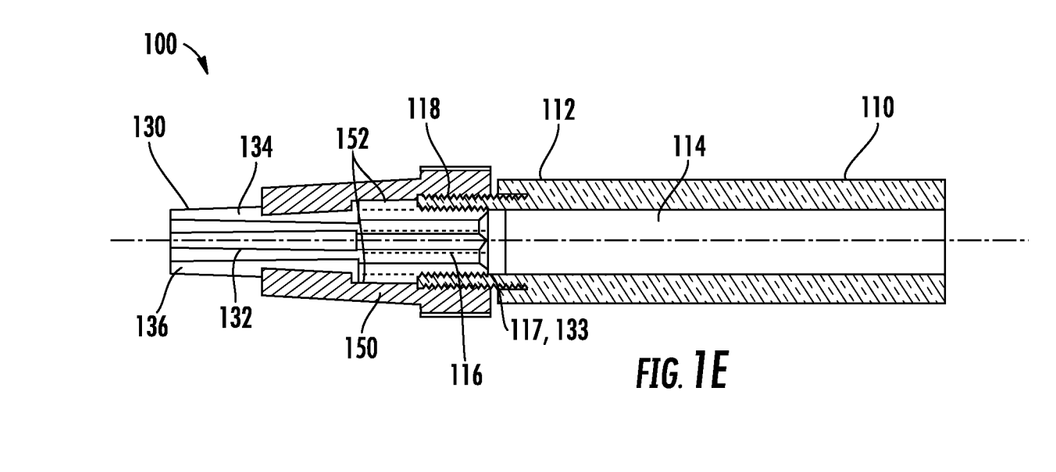
FIG. 1E is a cross-sectional view of a welding apparatus in accordance with the present disclosure configured to feed first and second welding wires therethrough.
Figure 1F:
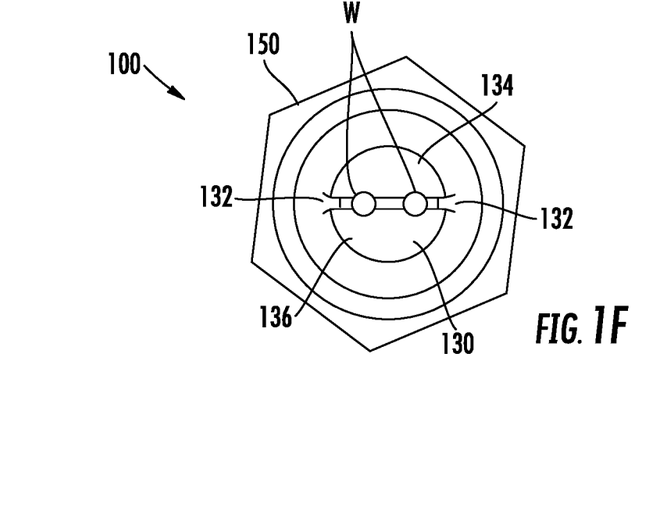
FIG. 1F is a distal end view of the contact device shown in FIG. 1E.
Figure 2A:
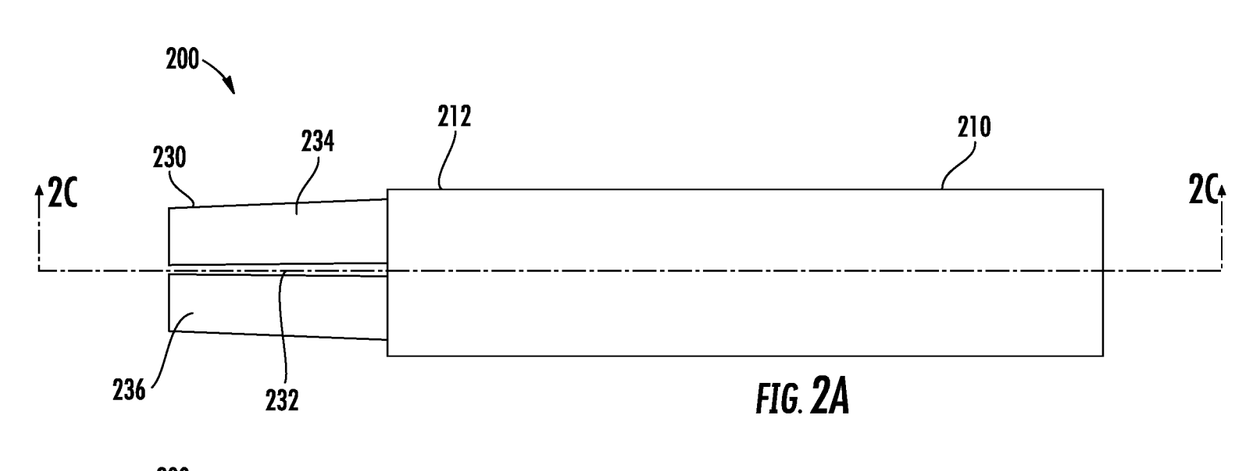
FIG. 2A is a side view illustrating a second contact device for use with a welding apparatus in accordance with the present disclosure.
Figure 2B:
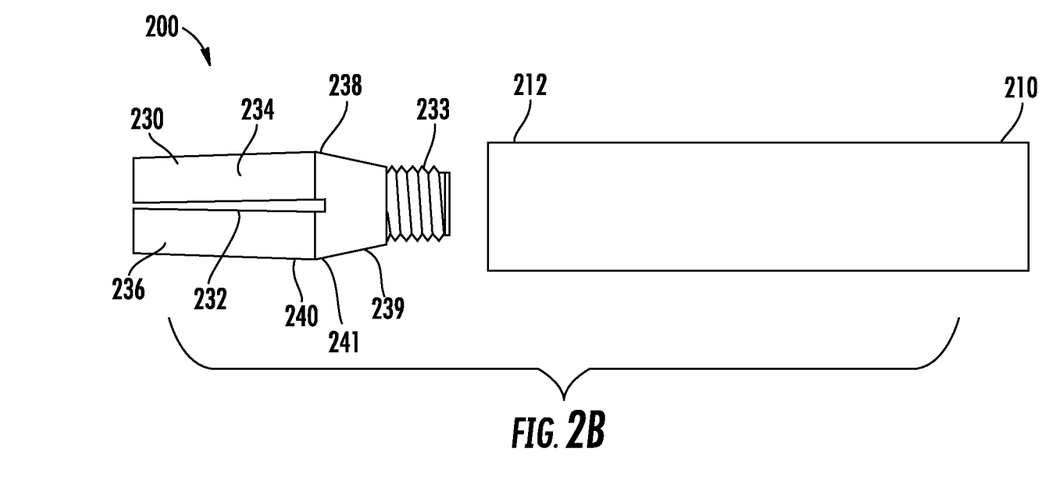
FIG. 2B is an exploded, side view of the contact device shown in FIG. 2A.
Figure 2C:
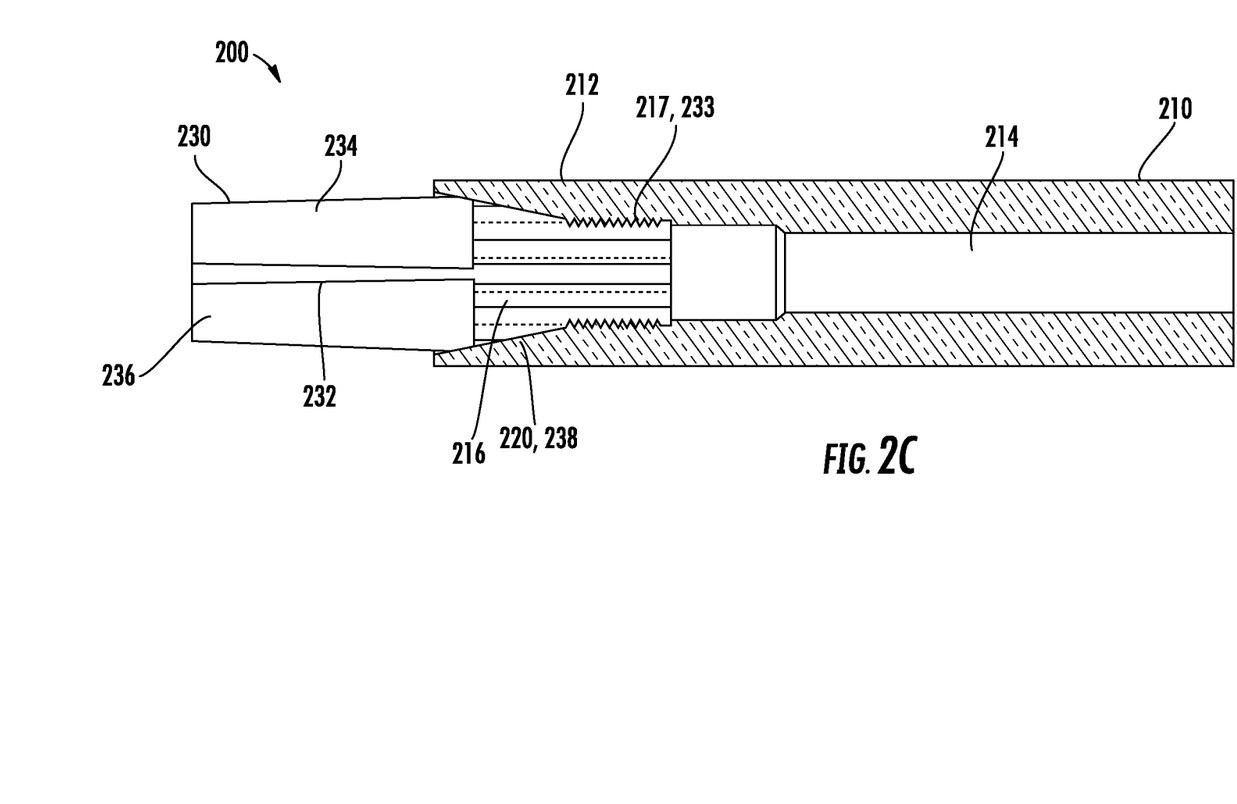
FIG. 2C is a cross-sectional view of the contact device taken along line 2C-2C of FIG. 2A.

Referring to FIGS. 2A-2C, a plurality of views of a contact device 200 for use with a welding apparatus in accordance with the present disclosure is shown.

The contact device 200 may include a split tip nozzle 230. The split tip nozzle 230 may include one or more slots 232 formed therein. In some embodiments, the split tip nozzle 230 may include a pair of diametrically opposed slots 232 to form first and second split tips 234, 236. As shown, the slots 232 may extend from a tip of the split tip nozzle 230 to a second end thereof. As will be appreciated by one of ordinary skill in the art, the formation of slots 232 in the split tip nozzle 230 provides the split tip nozzle 230 with enhanced flexibility to enhance engagement with one or more welding wires.

The contact device 200 may also include a contact tube 210. The contact tube 210 may include a first end 212, a second end (not shown), and a passageway 214 extending from the second end to the first end 212 for feeding one or more welding wires from the second end thereof to the split tip nozzle 230. The first end 212 of the contact tube 210 may include a bore 216 for receiving the split tip nozzle 230. The split tip nozzle 230 may be coupled to the contact tube 210 by any means now known or hereafter developed, for example, friction fit, snap-fit, adhesive, etc. As shown, the split tip nozzle 230 may include an externally threaded projection 233 for engaging an internally threaded portion 217 of the bore 216 formed in the tube 210.

As shown, the bore 216 may include a tapered surface 220 for contacting and interacting with a tapered surface 238 formed on the split tip nozzle 230. More specifically, as shown, the split tip nozzle 230 may include an outwardly tapered surface 239 adjacent an inwardly tapered surface 240, thus forming an apex 241. In use, the interaction between the tapered surfaces 220, 238, and more specifically contact between the apex 241 and the tapered surface 220 formed on the interior surface of the bore 216, applies a radially inward biasing force to the first and second split tips 234, 236, the force magnitude being a function of the relative axial positions between apex 241 and surface 220. As a result the force applied to bias the first and second split tips 234, 236 together can be adjusted to maintain a consistent pressure against one or more welding wires being fed therethrough. In other words, this allows the user to customize the amount of force that is applied by the first and second split tips 234, 236 to the one or more welding wires.

In use, one or more welding wires are fed through the passageway 214 formed in the contact tube 210 and through the split tip nozzle 230 to the welding puddle. As one or more welding wires are passed through the split tip nozzle 230, the welding power is transferred from the split tip nozzle 230 to the one or more welding wires so that an arc may be formed or maintained between the wires and the workpieces. During the lifecycle of the contact device 200, the split tip nozzle 230 may experience wear that can adversely affect contact between the wire(s) and the first and second split tips 234, 236. For instances involving slight or minimum amounts of initial wear, the user can make slight adjustments to accommodate for the wear by further tightening the split tip nozzle 230 to force the first and second split tips 234, 236 closer together. Alternatively, the user can fully tighten the split tip nozzle 230 to enable the inherent flex in the first and second split tips 234, 236 to adjust for the wear. In some embodiments, the wear may be so significant that the split tip nozzle 230 may need to be replaced. To replace the split tip nozzle 230, the user removes the existing split tip nozzle 230 from the contact tube 210. Thereafter, the user threadably couples a new split tip nozzle 230 to the contact tube and adjusts the amount of engagement between the split tip nozzle and contact tube to provide a desired biasing force between the first and second split tips 234, 236.

As will be appreciated, the inherent flex provided by the slots 232 formed in the split tip nozzle 230 along with the radially inward biasing force supplied by the interaction between the tapered surfaces 220, 238 ensures that a desired contact between the split tip nozzle 230 and the one or more welding wires is maintained throughout the lifecycle of the split tip nozzle 230. As the split tip nozzle 230 becomes worn out, such wear may be easily detected by viewing that both sides of the split tip nozzle 230 (e.g., first and second split tips 234, 236) are in contact with each other or are within a predefined distance from each other. Feeding one or more welding wires through the device may be done in advance of, or after, coupling the split tip nozzle 230 to the contact tube 210.

Figure 3A:
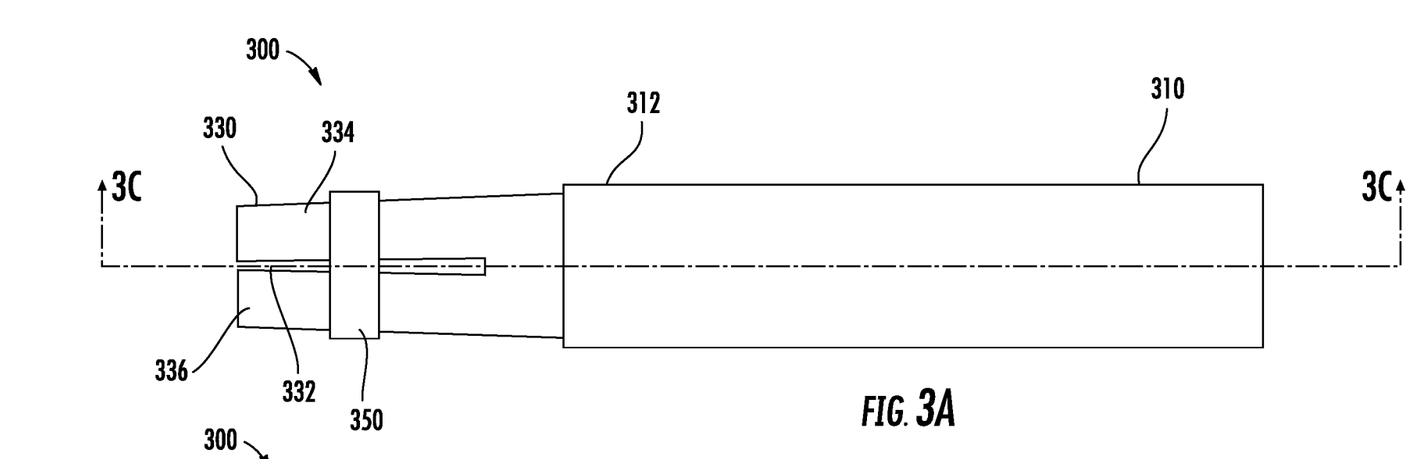
FIG. 3A is a side view illustrating a third contact device for use with a welding apparatus in accordance with the present disclosure.
Figure 3B:
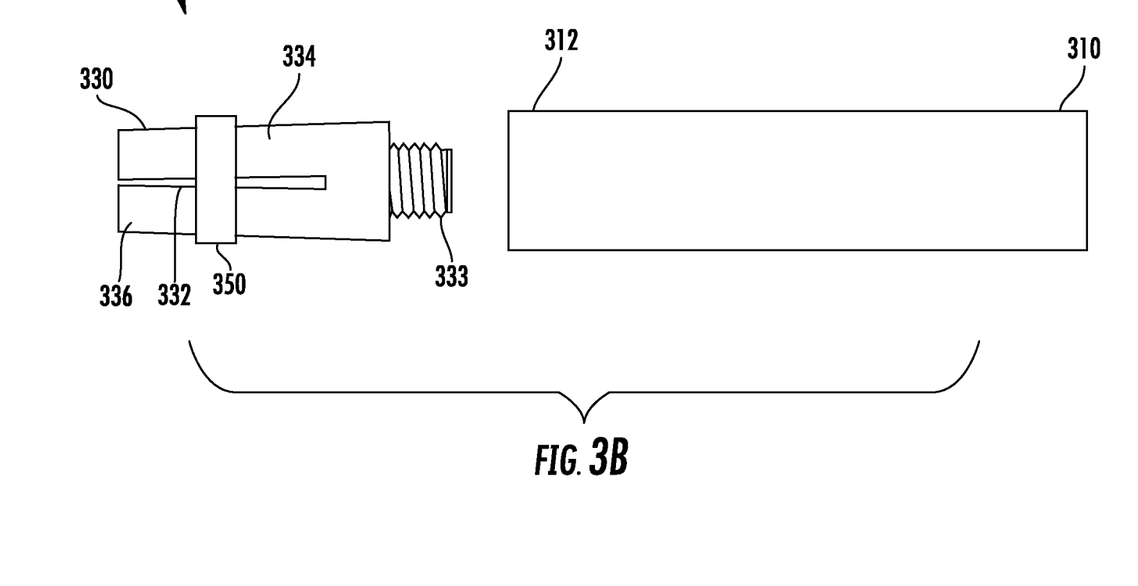
FIG. 3B is an exploded, side view of the contact device shown in FIG. 3A.
Figure 3C:
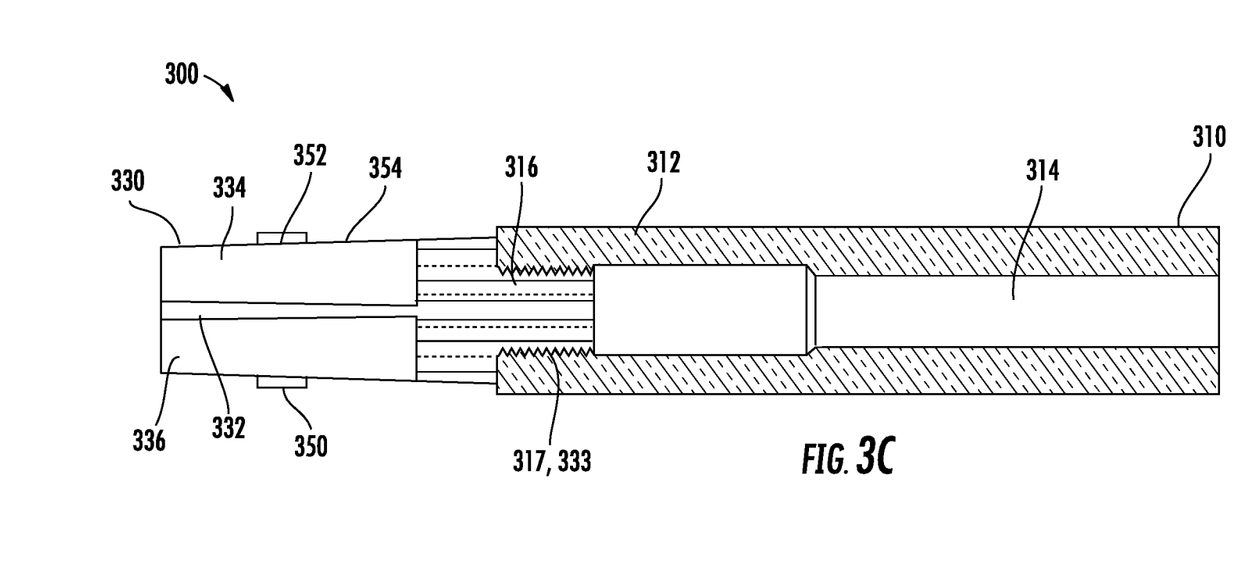
FIG. 3C is a cross-sectional view of the contact device taken along line 3C-3C of FIG. 3A.

Referring to FIGS. 3A-3C, a front view of a contact device 300 for use with a welding apparatus in accordance with the present disclosure is shown.

The contact device 300 may include a split tip nozzle 330. The split tip nozzle 330 may include one or more slots 332 formed therein. In some embodiments, the split tip nozzle 330 may include a pair of diametrically opposed slots 332 to form first and second split tips 334, 336. As shown, the slots 332 may extend from a tip of the split tip nozzle 330 to a second end thereof. As will be appreciated by one of ordinary skill in the art, the formation of slots 332 in the split tip nozzle 330 provides the split tip nozzle 330 with enhanced flexibility to enhance engagement with one or more welding wires.

The contact device 300 may also include a contact tube 310. The contact tube 310 may include a first end 312, a second end (not shown), and a passageway 314 extending from the second end to the first end 312 for feeding one or more welding wires from the second end thereof to the split tip nozzle 330. The first end 312 of the contact tube 310 may include a bore 316 for receiving the split tip nozzle 330. The split tip nozzle 330 may be coupled to the contact tube 310 by any means now known or hereafter developed, for example, friction fit, snap-fit, adhesive, etc. As shown, the split tip nozzle 330 may include an externally threaded projection 333 for engaging an internally threaded portion 317 of the bore 316 formed in the tube 310.

As shown, the split tip nozzle 330 may include a pre-mounted biasing member 350, for example, a compression or cylinder spring, mounted thereon. In use, the pre-mounted biasing member 350 applies a radially inward biasing force to the first and second split tips 334, 336 at a magnitude determined by its axial position along the tips to thereby bias the first and second split tips 334, 336 together to provide a force for supplying consistent pressure against the one or more welding wires being fed therethrough. That is, the pre-mounted biasing member 350 may include an inner tapered surface 352 for contacting and interacting with a tapered surface 354 formed on the split tip nozzle 330. In use, the interaction between the tapered surfaces 352, 354 applies a radially inward biasing force, at a magnitude determined by its axial position, to the first and second split tips 334, 336 to thereby bias the first and second split tips 334, 336 together to provide a force for supplying consistent pressure against one or more welding wires being fed therethrough. For example, the pre-mounted biasing member 350 may include an internal frustoconical shape so that moving the pre-mounted biasing member 350 towards the contact tube 310 forces the first and second split tips 334, 336 together via interaction between the conical surface formed on the inside of the pre-mounted biasing member 350 and the tapered surface formed on the exterior of the split tip nozzle 330. This allows the user to customize the amount of force that is applied by the first and second split tips 334, 336 to the one or more welding wires.

The pre-mounted biasing member 350 may be manufactured from copper or a copper alloy, for example, Hovadur. In use, the pre-mounted biasing member 350 forces the first and second splits tips 334, 336 together. The inherent flexibility in the member 350 enables the first and second split tips 334, 336 to flex apart as required to accommodate the welding wire.

In use, one or more welding wires are fed through the passageway 314 formed in the contact tube 310 and through the split tip nozzle 330 to the welding puddle. As the one or more welding wires are passed through the split tip nozzle 330, the welding power is transferred from the split tip nozzle 330 to the one or more welding wires so that an arc may be formed or maintained between the wires and the workpieces. During the lifecycle of the contact device 300, the split tip nozzle 330 may experience wear that can adversely affect contact between the wire(s) and the split tip nozzle 330. In some embodiments, the wear may be so significant that the split tip nozzle 330 may need to be replaced. To replace the split tip nozzle 330, the user removes the existing split tip nozzle 330 from the contact tube 310. Thereafter, the user threadably couples a new split tip nozzle 330 to the contact tube 310 and adjusts the amount of engagement between the split tip nozzle 330 and contact tube to provide a desired biasing force between the first and second split tips 334, 336.

As will be appreciated, the inherent flex provided by the slots 332 formed in the split tip nozzle 330 along with the biasing force supplied by the pre-mounted biasing member 350 ensures that desired contact between the split tip nozzle 330 and the one or more welding wires is maintained throughout the lifecycle of the split tip nozzle 330. As the split tip nozzle 330 becomes worn out, such wear may be easily detected by viewing that both sides of the split tip nozzle 330 (e.g., first and second split tips 334, 336) are in contact with each other or are within a predefined distance from each other. Feeding through the one or more welding wires may be done in advance of, or after, coupling the split tip nozzle 330.

Figure 4A:
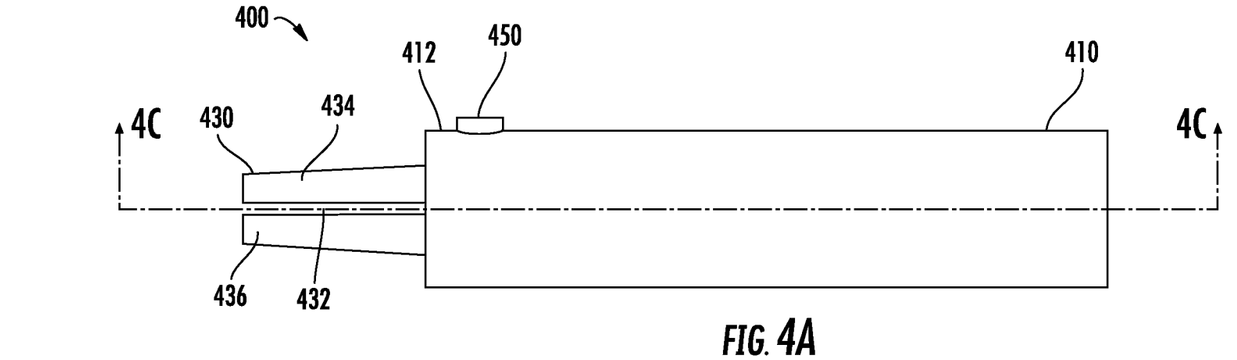
FIG. 4A is a side view illustrating a fourth contact device for use with a welding apparatus in accordance with the present disclosure.
Figure 4B:
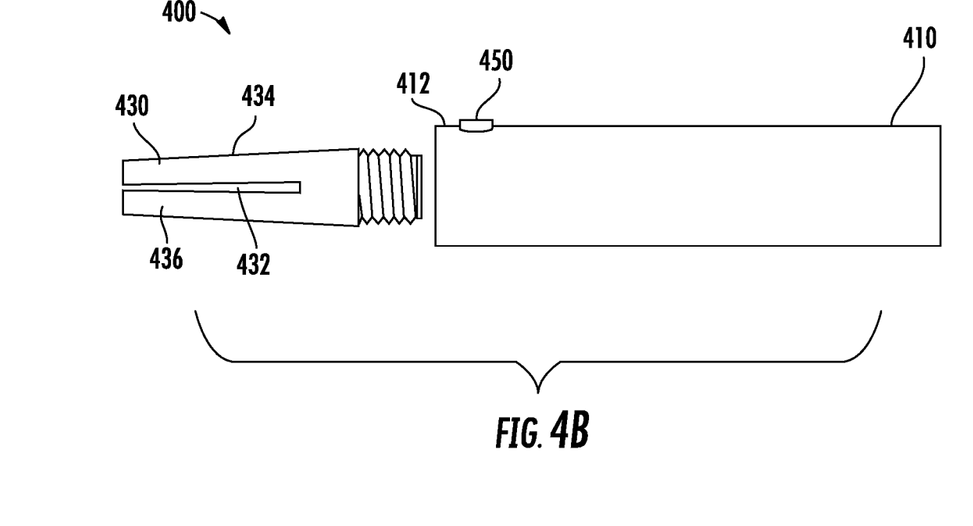
FIG. 4B is an exploded, side view of the contact device shown in FIG. 4A.
Figure 4C:
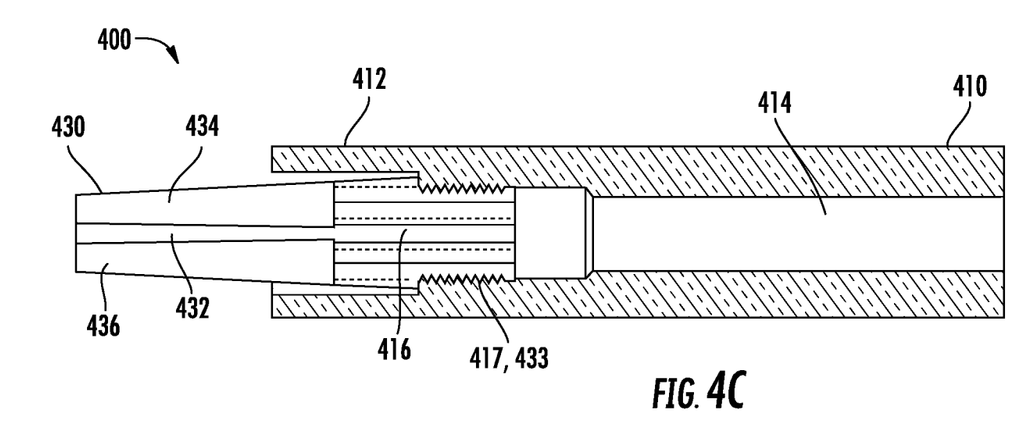
FIG. 4C is a cross-sectional view of the contact device taken along line 4C-4C of FIG. 4A.

Referring to FIGS. 4A-4C, a front view of a contact device 400 for use with a welding apparatus in accordance with the present disclosure is shown.

The contact device 400 may include a split tip nozzle 430. The split tip nozzle 430 may include one or more slots 432 formed therein. In some embodiments, the split tip nozzle 430 may include a pair of diametrically opposed slots 432 to form first and second split tips 434, 436. As shown, the slots 432 may extend from a tip of the split tip nozzle 430 to a second end thereof. As will be appreciated by one of ordinary skill in the art, the formation of slots 432 in the split tip nozzle 430 provides the split tip nozzle 430 with enhanced flexibility to enhance engagement with one or more welding wires.

The contact device 400 may also include a contact tube 410. The contact tube 410 may include a first end 412, a second end (not shown), and a passageway 414 extending from the second end to the first end 412 for feeding one or more welding wires from the second end thereof to the split tip nozzle 430. The first end 412 of the contact tube 410 may include a bore 416 for receiving the split tip nozzle 430. The split tip nozzle 430 may be coupled to the contact tube 410 by any means now known or hereafter developed, for example, friction fit, snap-fit, adhesive, etc. As shown, the split tip nozzle 430 may include an externally threaded projection 433 for engaging an internally threaded portion 417 of the bore 416 formed in the tube 410.

As shown, the first end 412 of the tube 410 may include an internally threaded bore (not shown) for engaging a biasing adjustment screw 450. In use, rotating the biasing adjustment screw 450 applies a radially inward biasing force to the first split tip 434 to thereby bias the first and second split tips 434, 436 together to provide a force for supplying consistent pressure against the one or more welding wires being fed therethrough. As will be appreciated by one of ordinary skill in the art, the biasing adjustment screw 450 may contact the second split tip 436 for biasing the second split tip 436 against the first split tip 434. Alternatively, the contact device 400 may include a plurality of tensioning screws 450, for example, first and second tensioning screws 450 for contacting the first and second split tips 434, 436 respectively. By varying the rotation of the tensioning screw 450, the user is permitted to customize the amount of force that is applied by the first and second split tips 434, 436 to the one or more welding wires.

In use, one or more welding wires are fed through the passageway 414 formed in the contact tube 410 and through the split tip nozzle 430 to the welding puddle. As the one or more welding wires are passed through the split tip nozzle 430, the welding power is transferred from the split tip nozzle 430 to the one or more welding wires so that an arc may be formed or maintained between the wires and the workpieces. During the lifecycle of the contact device 400, the split tip nozzle 430 may experience wear that can adversely affect contact between the wire(s) and the split tip nozzle 430. For instances involving slight or minimum amounts of initial wear, the user can make slight adjustments to accommodate for the wear by further tightening the tensioning screw 450 to force the first and second split tips 434, 436 closer together. Alternatively, the user can fully tighten the tensioning screw 450 to enable the inherent flex in the first and second split tips 434, 436 to adjust for the wear. In some embodiments, the wear may be so significant that the split tip nozzle 430 may need to be replaced. To replace the split tip nozzle 430, the user removes the tensioning screw 450 from the internally threaded bore formed in the tube 410. Next, the user removes the existing split tip nozzle 430 from the contact tube 410. Thereafter, the user threadably couples a new split tip nozzle 430 to the contact tube 410 and threadably rotates the tensioning screw 450 with respect to the threaded bore so that the biasing adjustment screw 450 contacts and biases the first and second split tips 434, 436 to provide a desired biasing force between the first and second split tips 434, 436.

As will be appreciated, the inherent flex provided by the slots 432 formed in the split tip nozzle 430 along with the biasing force supplied by the biasing adjustment screw 450 ensures that desired contact between the split tip nozzle 430 and the one or more welding wires is maintained throughout the lifecycle of the split tip nozzle 430. As the split tip nozzle 430 becomes worn out, such wear may be easily detected by viewing that both sides of the split tip nozzle 430 (e.g., first and second split tips 434, 436) are in contact with each other or are within a predefined distance from each other. Feeding through the one or more welding wires may be done in advance of, or after, coupling the split tip nozzle 430.

In use, the first and second split tips formed in the split tip nozzle provide the contact device with improved flexibility to individually and independently flex about the one or more welding wires. Furthermore, when used in combination with a biasing force, the split tip nozzle ensures improved contact with the one or more welding wires throughout the lifecycle of the contact device.

The split tip nozzle may be manufactured from any appropriate electrically conductive material now known or hereafter developed, including, for example, a high strength, temperature resistant copper alloy. In one embodiment, the split tip nozzle may operate at a temperature below 300° Celsius (e.g., below the softening temperature of the high strength, temperature resistant cooper alloy. By manufacturing the split tip nozzle from a high strength copper alloy, concerns that the first and second split tips may melt or easily deform if they are made too thin, subside. In one embodiment, the split tip nozzle may be made from a material having a yield strength of approximately 300-400 MPa.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A contact device for feeding current to one or more welding wires, the contact device comprising:
   a nozzle that directly contacts one or more welding wires, the one or more welding wires entering the nozzle at a second end of the nozzle and exiting the nozzle at a first end of the nozzle, the nozzle including at least one slot formed therein, the at least one slot extending from the first end towards the second end to form first and second tips that are split apart from each other; and
   a biasing means for applying an adjustable biasing force to at least one of the first and second tips towards an other of the first and second tips, wherein a portion of the nozzle adjacent the first end extends beyond the biasing means to form an outer surface of the contact device, the portion being a tapered portion that converges towards the first end,
   wherein the biasing means is configured to adjust a magnitude of the biasing force based on an axial position of the biasing means along the tapered portion.

2. The contact device of claim 1, wherein the biasing force comprises a radially inward biasing force to bias each of the first and second tips towards the other of the first and second tips.

3. The contact device of claim 1, wherein the at least one slot includes first and second diametrically opposed slots.

4. The contact device of claim 3, wherein the biasing means applies a radially inward biasing force to bias each of the first and second tips towards the other of the first and second tips.

5. The contact device of claim 1, further comprising a contact tube with a first end that is operatively coupled to the nozzle.

6. The contact device of claim 5, wherein the portion of the nozzle is a first portion, and the contact tube includes a bore formed in the first end thereof, the bore including a partially threaded portion for threadably receiving a second portion of the a nozzle, the second portion being adjacent the second end.

7. The contact device of claim 6, wherein the first end of the contact tube also includes an externally threaded portion and the biasing means comprises a compression ring including:
   internal threads for engaging the externally threaded portion of the contact tube; and
   an internally tapered surface for contacting an exterior surface of the first and second tips, an interaction between the internally tapered surface and the exterior surface applying the biasing force to bias the first and second tips together.

8. The contact device of claim 6, wherein the biasing means comprises a tapered surface of the bore, the tapered surface configured to contact a tapered surface formed on the nozzle, and wherein an interaction between the tapered surface of the bore and the tapered surface formed on the nozzle applies the biasing force to bias the first and second tips together.

9. The contact device of claim 5, wherein the contact tube includes a bore with a tapered surface formed in the first end, the biasing means comprising the tapered surface, and the nozzle comprising:
   a first tapered surface adjacent to a second tapered surface to form an apex, an interaction between the tapered surface formed in the bore and the apex applying the biasing force to bias the first and second tips together.

10. The contact device of claim 5, wherein the biasing means comprises at least one biasing adjustment screw, wherein the contact tube further includes at least one internally threaded bore for threadably engaging the at least one biasing adjustment screw, and the at least one biasing adjustment screw applies the biasing force to bias the first and second tips together.

11. The contact device of claim 5, wherein the portion of the nozzle adjacent the first end also extends beyond the first end of the contact tube.

12. The contact device of claim 1, wherein the biasing means includes an axially moveable biasing member surrounding the first and second tips, the biasing member including an internally tapered surface for contacting an exterior surface of the first and second tips, an interaction between the internally tapered surface and the exterior surface applying the biasing force to bias the first and second tips together.

13. The contact device of claim 12, wherein the axially moveable biasing member is configured to be mounted to the first and second tips prior to installation of the nozzle in a contact tube.

14. The contact device of claim 12, wherein the biasing member is a compression spring or cylinder spring.

15. The contact device of claim 1, wherein the biasing means comprises a biasing member surrounding the first and second tips, the biasing member including an internally tapered surface for contacting an exterior surface of the first and second tips, an interaction between the internally tapered surface and the exterior surface applying the biasing force to bias the first and second tips together.

16. The contact device of claim 15, wherein the biasing member is a compression spring or cylinder spring.

17. The contact device of claim 1, wherein the one or more welding wires comprise two wires; and
    the nozzle is configured to guide the two wires along parallel, but spaced apart, paths.

18. The contact device of claim 17, wherein the at least one slot extends between the two wires and laterally exterior of each of the two wires.

19. The contact device of claim 1, wherein relative axial movement between the biasing means and the tapered portion in a first direction increases the magnitude of the biasing force; and
    relative axial movement between the biasing means and the tapered portion in a second direction decreases the magnitude of the biasing force.

\* \* \* \* \*

UNITED STATES PATENT AND TRADEMARK OFFICE
CERTIFICATE OF CORRECTION

PATENT NO. : 10,857,617 B2
APPLICATION NO. : 15/630705
DATED : December 8, 2020
INVENTOR(S) : Raudsepp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this
Tenth Day of January, 2023

Katherine Kelly Vidal
*Director of the United States Patent and Trademark Office*